(12) United States Patent
Mitchell et al.

(10) Patent No.: US 11,007,979 B1
(45) Date of Patent: May 18, 2021

(54) VEHICLE THEFT DETECTION

(71) Applicant: Spireon, Inc., Irvine, CA (US)

(72) Inventors: Ocie Mitchell, Yorba Linda, CA (US); Prem Hareesh, Irvine, CA (US)

(73) Assignee: Spireon, Inc., Irvine, CA (US)

( * ) Notice: Subject to any disclaimer, the term of this patent is extended or adjusted under 35 U.S.C. 154(b) by 0 days.

(21) Appl. No.: 16/793,389

(22) Filed: Feb. 18, 2020

(51) Int. Cl.
*G06Q 40/08* (2012.01)
*B60R 25/33* (2013.01)
*B60W 40/09* (2012.01)
*B60R 25/102* (2013.01)

(52) U.S. Cl.
CPC ............ *B60R 25/33* (2013.01); *B60R 25/102* (2013.01); *B60W 40/09* (2013.01); *B60R 2325/205* (2013.01)

(58) Field of Classification Search
CPC ......... B60R 25/32; B60R 25/30; B60W 40/09
See application file for complete search history.

(56) References Cited

U.S. PATENT DOCUMENTS

| | | | |
|---|---|---|---|
| 8,510,200 B2 | 8/2013 | Pearlman et al. | |
| 9,141,582 B1* | 9/2015 | Brinkmann | G07C 5/0808 |
| 9,779,449 B2 | 10/2017 | Meyer et al. | |
| 10,017,155 B1* | 7/2018 | Allouche | B60R 25/01 |
| 10,169,822 B2 | 1/2019 | Jarvis et al. | |
| 10,232,823 B1 | 3/2019 | Bobay et al. | |
| 10,255,824 B2 | 4/2019 | Pearlman et al. | |
| 2011/0246025 A1* | 10/2011 | Ishihara | G08G 1/20 |
| | | | 701/36 |
| 2015/0019270 A1 | 1/2015 | Jarvis et al. | |
| 2016/0001782 A1* | 1/2016 | Fiedler | B60R 25/20 |
| | | | 340/5.81 |
| 2019/0073735 A1* | 3/2019 | Conlon | B60R 25/33 |
| 2019/0130664 A1* | 5/2019 | Appel | B60W 40/09 |
| 2020/0017117 A1* | 1/2020 | Milton | B60W 50/02 |

* cited by examiner

*Primary Examiner* — Hongmin Fan
(74) *Attorney, Agent, or Firm* — Luedeka Neely Group, P.C.

(57) ABSTRACT

A vehicle theft detection system uses data from a GPS vehicle tracking unit, information regarding previous driving behavior of the authorized driver, and integration with a smartphone application to determine the likelihood that a vehicle has been stolen.

24 Claims, 3 Drawing Sheets

VEHICLE THEFT DETECTION

FIELD

This invention relates to the field of vehicle security and tracking. More particularly, this invention relates to a system for detecting theft of a vehicle in which a vehicle tracking device is installed.

BACKGROUND

Vehicle tampering and theft of vehicles and/or property within vehicles is an ongoing problem for vehicle owners. Although many technology solutions have been proposed for monitoring vehicles to detect tampering or theft, most of the prior solutions rely on the vehicle owner noticing that the vehicle has been stolen. This potentially gives a thief a significant amount of lead time before authorities are notified.

What is needed, therefore, is a vehicle monitoring system that uses information from a vehicle tracking device and information regarding driving behavior of the vehicle owner to detect that an entity other than the vehicle owner is operating the vehicle.

SUMMARY

Embodiments of the invention described herein use data from a GPS vehicle tracking unit installed in a vehicle, information regarding previous driving behavior of an authorized driver of the vehicle, and integration with a smartphone application to determine the likelihood that the vehicle has been stolen. Information that may be used to assess the possibility of a vehicle theft include:
  detected behavior of a current driver that does not match the expected behavior of the authorized driver, such as based on acceleration/speed/braking data;
  timing of the vehicle entering/leaving predicted zones (e.g. home, school, and workplace) that does not match the authorized driver's normal pattern;
  detection of the vehicle being driven into a high-crime area that is inconsistent with expected driver behavior;
  proximity of the authorized driver's smartphone to the vehicle;
  soft lock being applied manually or automatically by the driver (e.g. the driver sets a lock when leaving the vehicle parked for an extended time);
  entry of a destination/route in a third party navigation system on the authorized driver's smartphone that matches the vehicle's current location; and
  feedback/confirmation of anomalous behavior provided by the authorized driver via a smartphone application.

One advantage provided by embodiments described herein over known recovery methodologies is earlier detection of the theft, resulting in a higher likelihood that the vehicle will be recovered.

Another advantage provided by embodiments described herein is that they learn the user's driving habits, and therefore do not depend on the user having to remember to update stored fixed geo-boundaries as are used in prior systems. The preferred embodiments also generate fewer false positives, which is a problem with fixed-boundary alert systems. A user is likely to ignore fixed geo-boundary alerts that may occur multiple times during a day, whereas alerts provided by the preferred embodiments occur less frequently, and are more likely to indicate an actual problem when they do occur.

In one aspect, embodiments described herein are directed to a computer-implemented method for detecting theft of a vehicle in which a vehicle monitoring device is installed. A preferred embodiment of the method includes:
  (a) receiving initial vehicle data transmitted from the vehicle monitoring device while the vehicle is driven by an authorized driver over an initial period of time, wherein the initial vehicle data include vehicle location data and vehicle motion data that are indicative of the driving behavior of the authorized driver during the initial period of time;
  (b) processing the initial vehicle data using machine learning software to ascertain patterns in routes, destinations, speed, and acceleration of the vehicle when driven by the authorized driver during the initial period of time;
  (c) receiving subsequent vehicle data transmitted from the vehicle monitoring device while the vehicle is driven on a trip after the initial period of time, wherein the subsequent vehicle data include vehicle location data and vehicle motion data that are indicative of the driving behavior of a driver of the vehicle during the trip;
  (d) comparing the subsequent vehicle data to the patterns ascertained in step (b), and calculating behavior correlation scores based on the comparison;
  (e) determining a theft probability value based at least in part on the behavior correlation scores;
  (f) comparing the theft probability value to a theft concern threshold;
  (g) if the theft probability value exceeds the theft concern threshold, sending a query message to a mobile communication device associated with the authorized driver, wherein the query message inquires whether the authorized driver is driving the vehicle during the trip; and
  (h) receiving a response message transmitted from the mobile communication device associated with the authorized driver, wherein the response message includes response information indicating whether or not the authorized driver is driving the vehicle during the trip.

In some embodiments, if the response information indicates that the authorized driver is driving the vehicle on the trip, the machine learning software uses the response information to refine the patterns ascertained in step (b), and the method continues at step (c).

In some embodiments, if the response information indicates that the authorized driver is not driving the vehicle on the trip, a theft alert message is sent to the mobile communication device associated with the authorized driver, wherein the theft alert message includes a current location of the vehicle.

In some embodiments, the patterns ascertained in step (b) include patterns in acceleration from a stop, braking, speed around curves, observance or nonobservance of speed limits, routes taken on a daily basis, and daily destinations.

In some embodiments, the method includes:
  acquiring device location data from the mobile communication device associated with the authorized driver, wherein the device location data indicate a current location of the mobile communication device;
  comparing the current location of the mobile communication device to a current location of the vehicle determined from the vehicle location data;

calculating a location correlation score based on comparing the current location of the vehicle to the current location of the mobile communication device; and including the location correlation score in the determination of the theft probability value.

In some embodiments, the method includes:

acquiring soft lock location data from the vehicle monitoring device, wherein the soft lock location data indicate a location at which the authorized driver parked and left the vehicle;

periodically acquiring current vehicle location data after acquisition of the soft lock location data;

comparing the current vehicle location data to the soft lock location data;

calculating a soft lock location correlation score based on comparison of the current vehicle location data to the soft lock location data; and including the soft lock location correlation score in the determination of the theft probability value.

In some embodiments, the method includes:

determining based on the vehicle location data whether the vehicle is traveling through a high crime area;

calculating a high crime area correlation score based on whether the vehicle is traveling through a high crime area; and including the high crime area correlation score in the determination of the theft probability value.

In some embodiments, the method includes:

acquiring route navigation data from the mobile communication device, wherein the route navigation data indicate a planned route for the trip that is determined by a GPS navigation application running on the mobile communication device;

comparing the current vehicle location data to the route navigation data;

calculating a route navigation correlation score based on comparison of the current vehicle location data to the route navigation data; and including the route navigation correlation score in the determination of the theft probability value.

In some embodiments, the subsequent vehicle data received in step (c) is used to refine the patterns ascertained in step (b) as the vehicle is driven by the authorized driver during trips occurring after the initial period of time.

In some embodiments, the vehicle motion data includes vehicle speed information and vehicle acceleration information.

In another aspect, embodiments described herein are directed to a vehicle monitoring system that includes a vehicle monitoring device configured for installation in a vehicle, a mobile communication device associated with an authorized driver of the vehicle, and a central vehicle monitoring server that is in communication with the vehicle monitoring device and the mobile communication device via a wireless data network.

In a preferred embodiment, the vehicle monitoring device includes sensors for generating vehicle motion data indicative of vehicle speed and vehicle acceleration, a GPS receiver for generating vehicle location data, a data processor for processing the vehicle motion data and the vehicle location data, and a wireless data transceiver for transmitting the vehicle motion data and the vehicle location data via the wireless data network.

The mobile communication device preferably includes a GPS receiver for generating mobile communication device location data, a wireless data transceiver for transmitting the mobile communication device location data and receiving commands and messages via the wireless data network, a data processor for processing the commands and messages, and a display device for displaying information related to the messages.

In a preferred embodiment, the central vehicle monitoring server executes instructions to:

receive initial vehicle data transmitted from the vehicle monitoring device while the vehicle is driven by an authorized driver over an initial period of time, wherein the initial vehicle data include vehicle location data and vehicle motion data that are indicative of the driving behavior of the authorized driver during the initial period of time;

process the initial vehicle data to ascertain patterns in one or more of routes, destinations, speed, and acceleration of the vehicle when driven by the authorized driver during the initial period of time;

receive subsequent vehicle data transmitted from the vehicle monitoring device while the vehicle is driven on a trip after the initial period of time, wherein the subsequent vehicle data include vehicle location data and vehicle motion data that are indicative of the driving behavior of a driver of the vehicle during the trip;

compare the subsequent vehicle data to the previously ascertained patterns, and calculate behavior correlation scores based on the comparison;

determine a theft probability value based at least in part on the behavior correlation scores;

compare the theft probability value to a theft concern threshold;

based on the theft probability value exceeding the theft concern threshold, send a query message to the mobile communication device, wherein the query message inquires whether the authorized driver is driving the vehicle during the trip; and receive a response message transmitted from the mobile communication device, wherein the response message includes response information indicating whether or not the authorized driver is driving the vehicle during the trip.

In some embodiments, if the response information indicates that the authorized driver is driving the vehicle on the trip, the central vehicle monitoring server uses the response information to refine the previously ascertained patterns.

In some embodiments, if the response information indicates that the authorized driver is not driving the vehicle on the trip, the central vehicle monitoring server sends a theft alert message to the mobile communication device, wherein the theft alert message includes a current location of the vehicle In some embodiments, the central vehicle monitoring server executes instructions to take into account a report of a vehicle being stolen after the fact. If a user reports the date/time that a vehicle was stolen, the system processes the vehicle data leading up the date/time of the theft to train its identification of stolen vehicle behavior.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
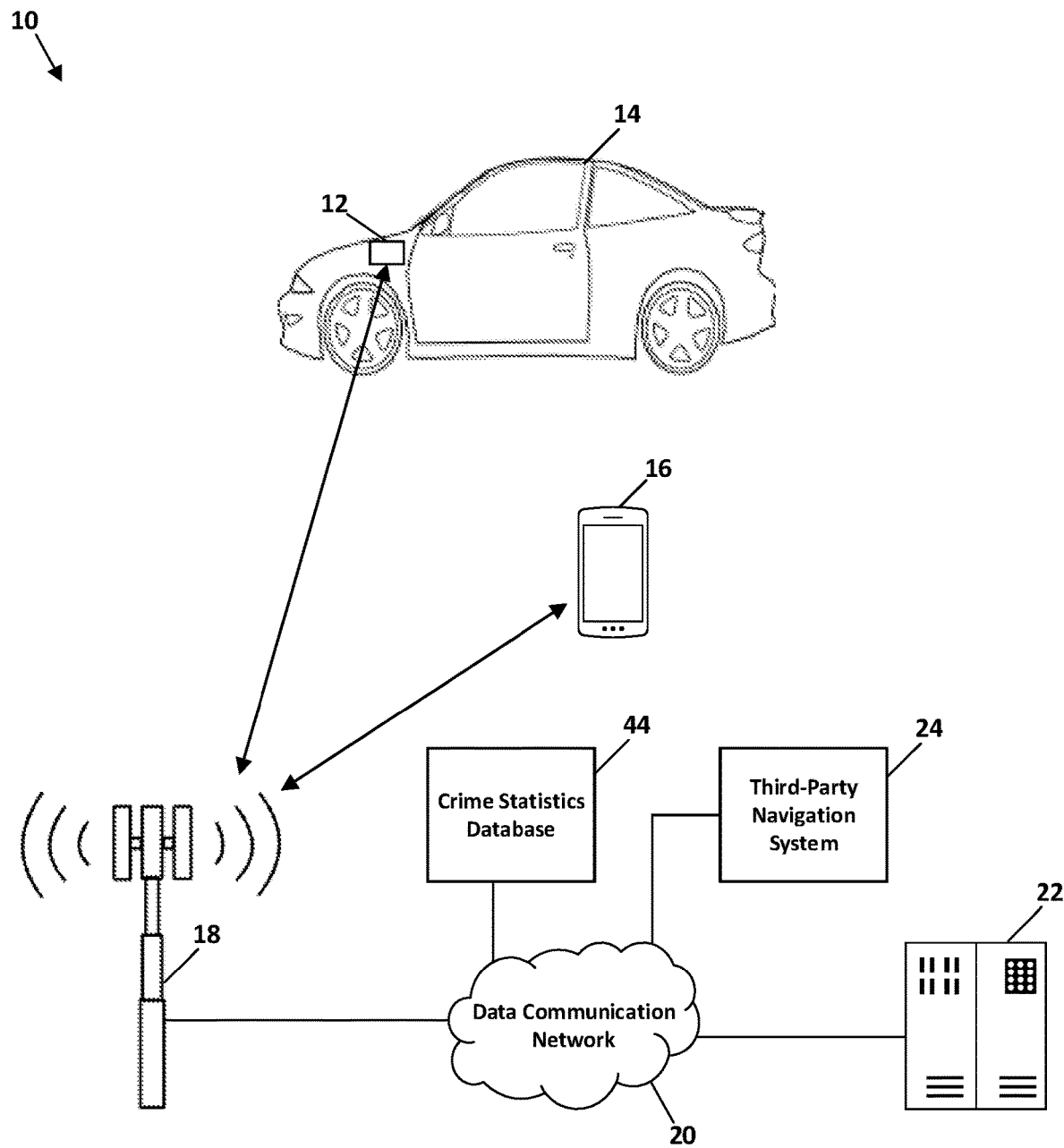
FIG. 1 depicts a vehicle theft detection system according to a preferred embodiment.

As shown in FIG. 1, a preferred embodiment of a vehicle theft detection system 10 includes a vehicle monitoring device 12 installed within a vehicle 14, and a mobile communication device 16, such as a smartphone, operated by an authorized driver of the vehicle 14. The vehicle monitoring device 12 and the mobile device 16 are operable to wirelessly communicate data through a wireless data communication system 18, such as a cellular data network or a Wi-Fi network. The wireless data communication system 18 is connected to a wide area data communication network 20, such as the Internet. A central server 22 is also connected to the wide area data communication network 20. The central server 22 includes one or more processors, memory devices, and mass data storage devices that handle data processing and storage tasks associated with the vehicle theft detection system 10 as described herein. In a preferred embodiment, the processors of the central server 22 execute machine learning software to implement various functions of the system.

Figure 2:
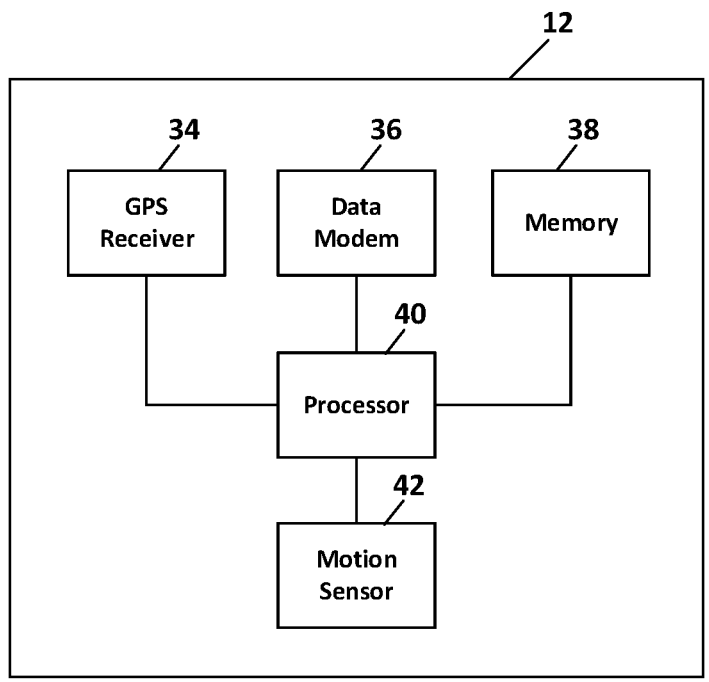
FIG. 2 depicts a vehicle monitoring and tracking device according to a preferred embodiment.

As shown in FIG. 2, the vehicle monitoring device 12 includes a Global Positioning System (GPS) receiver 34, a wireless data modem 36, memory 38, a data processor 40, and a motion sensor 42, such as an accelerometer. The wireless data modem 36 may comprise a cellular data transceiver. In a preferred embodiment, the vehicle monitoring device 12 is an after-market device installed by the vehicle owner or a car dealer. In an alternative embodiment, the device 12 is an OEM unit, such as used in General Motor's OnStar™ system. In some embodiments, the vehicle monitoring device 12 is connected to the vehicle's onboard diagnostics (OBD) port and receives power and vehicle data therefrom. Although the vehicle monitoring device 12 is preferably powered by the vehicle's battery, it may also include an internal battery for backup purposes.

Figure 3:
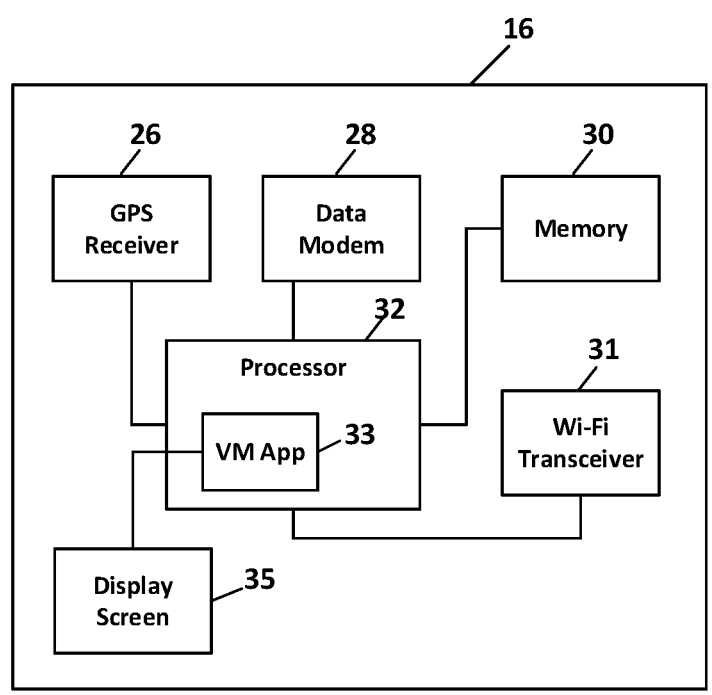
FIG. 3 depicts an authorized driver's mobile device according to a preferred embodiment.

As shown in FIG. 3, the authorized driver's mobile device 16 includes a GPS receiver 26, a wireless data modem 28, memory 30, a Wi-Fi transceiver 31, a data processor 32, and a display screen 35. As discussed in more detail hereinafter, the processor 32 executes instructions provided in a vehicle monitoring software application 33. In a preferred embodiment, the mobile device 16 is a smartphone. In alternative embodiments, the mobile device 16 is a tablet or a laptop computer. The wireless data modem 28 may comprise a cellular data transceiver. The mobile device 16 is preferably powered by an internal battery.

Figure 4:
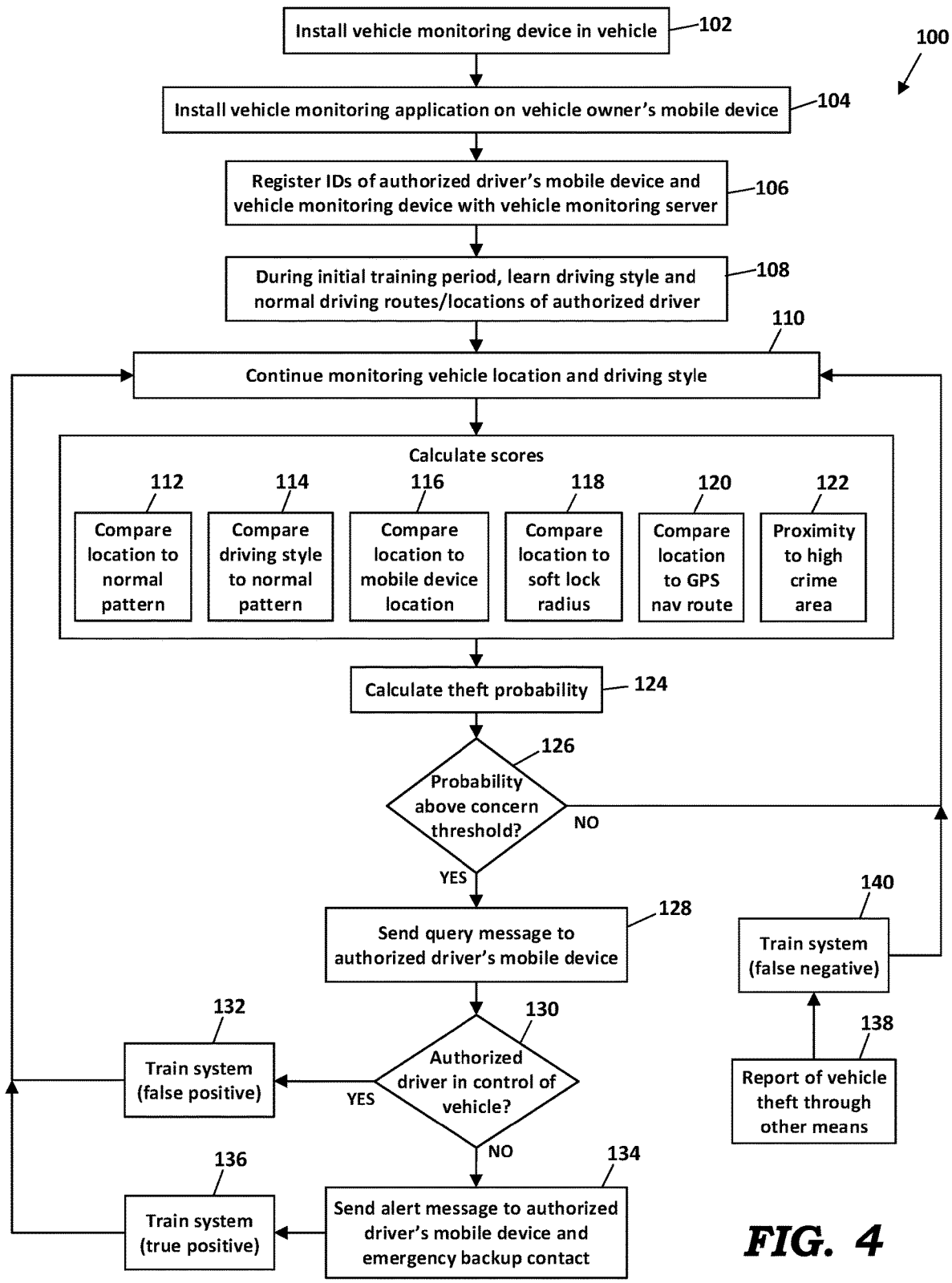
FIG. 4 depicts a method for detecting theft of a vehicle and proving alert messages to an authorized driver's mobile device according to a preferred embodiment.

A preferred embodiment of a method 100 for monitoring a vehicle and providing alert messages to the mobile device 16 is depicted in FIG. 4. Some portions of the method are performed by the vehicle monitoring device 12 that has been installed in the vehicle to be monitored (step 102), some portions are performed by the vehicle monitoring software application 33 that has been installed on the mobile device 16 (step 104), and some portions are performed by the central server 22.

So that data from a particular vehicle monitoring device 12 is properly associated with data from a particular mobile device 16, identification information for the vehicle monitoring device 12 is registered in a database on the central server 22 in association with identification information for the mobile device 16 (step 106). For example, step 106 may be performed by a setup routine during installation of the vehicle monitoring software application 33 on the mobile device 16.

After the vehicle monitoring device 12 has become associated with the authorized driver in the database of the central server 22, the machine learning software running on the server 22 learns the driving behaviors and typical routes and destinations of the authorized driver (step 108). In general, this is accomplished by monitoring data transmitted from the vehicle monitoring device 12 over an extended initial training period that encompasses multiple trips, and ascertaining patterns in routes, destinations, speed, and acceleration of the vehicle when driven by the authorized driver. For example, by monitoring the speed and acceleration data, the machine learning software ascertains patterns in driving behavior, such as typical high or low acceleration from a stop, typical hard or soft braking, typical high or low speed around curves, and typical observance or nonobservance of speed limits. By monitoring the location data, the machine learning software ascertains patterns in routes taken on a daily basis, such as to school or a place of work, and typical destinations along those routes, such as gas stations, electric vehicle charging stations, stores, or the gym. During this initial training period, which may last for several days or weeks, a preferred embodiment of the system does not generate and report theft alerts, as the confidence level of any such alerts would be low until the system learns the driver's patterns.

After completion of the initial training period, the machine learning software continues to receive the location, speed, and acceleration data transmitted from the vehicle monitoring device 12 (step 110). Based on this data, the machine learning software calculates correlation scores related to differences between the current driving behavior and the driver's typical patterns that were learned during the initial training period. Some correlation scores are also calculated based on the current location of the vehicle, as described in more detail hereinafter.

In some embodiments, the system calculates a first correlation score based on comparing the vehicle's current location to routes that the vehicle normally takes on a daily or weekly basis (step 112). For example, the first correlation score may range from 0 to 1, with 0 (or another very low value) indicating that the vehicle's current location is on a route that the vehicle has traveled previously (such as within the last month), and 1 (or close to one) indicating that the vehicle is traveling on a route that it has not traveled previously. The closer the vehicle is to a previously traveled route, the lower the score, and the further the vehicle is, the higher the score. For example, a two mile detour to a shopping center on the way to work would be non-zero, but would still be a lower score than driving 50 miles away in a location not visited in the past month. In one embodiment, the score may be defined as $\min(d/20,1)$, where $d$ is the distance in miles to the nearest previously-visited point. It will be appreciated that the value of 20 miles in the score calculation defined above is exemplary only, and other values may be used in other embodiments.

In some embodiments, the system calculates a second correlation score based on comparing the current driving behavior to the authorized driver's normal driving behavior (step 114). For example, the second correlation score may range from 0 to 1, with 0 indicating that the current driving behavior closely matches the normal driving behavior, and 1 indicating that the current driving behavior significantly deviates from normal behavior. In some embodiments, the second correlation score may be a composite correlation score that includes individual scores for individual behavior components, such as rate of acceleration from a stop, rate of braking, speed around curves, and observance of speed limits. For example, each of the individual scores may have a range of 0 to 1, with 0 indicating no deviation from normal behavior and 1 indicating significant deviation. In a preferred embodiment, these scores would be based on a comparison of current driving behavior to the range of observed past driving behavior (average+/−deviation), wherein differences between current and past driving behavior would be normalized by the standard deviation.

In some embodiments, the system calculates a third correlation score based on comparing the vehicle's current location to the location of the authorized driver's mobile communication device 16 (step 116). To acquire the location coordinates of the mobile device 16, the system sends a command message via the data communication network 20 to the vehicle monitoring software application 33 to cause the mobile device 16 to transmit its current location coordinates. Alternatively, the command message may be sent via a text message to the mobile device 16. Upon receipt of the command message, the mobile device 16 transmits a response message with the current location coordinates of the mobile device 16 (obtained from the GPS receiver 26) via data communication network 20 or text message. The software running on the server 22 then compares the location coordinates of the mobile device 16 with the current location coordinates of the vehicle monitoring device 12. The third correlation score is then set based on the distance between the current location of the mobile device 16 and the current location of the vehicle monitoring device 12. For example, if this distance is less than some preprogrammed radius, the score is set to 0, and if the distance is greater than the preprogrammed radius, the score is set to 1. The preprogrammed radius is preferably set to a value high enough to prevent generation of false positives due to GPS drift. During a trip, the mobile communication device and vehicle monitoring device will almost surely take GPS readings at different times and rates. In a preferred embodiment, the third correlation score will likely use interpolation to verify whether a GPS location reported from the mobile communication device lies along the route reported by the vehicle monitoring device and vice-versa.

In some embodiments, the system calculates a fourth correlation score based on the vehicle's soft lock status (step 118). This score is based on the distance between the vehicle's current location and the location at which it was last parked by the authorized driver. For example, if this distance is less than some preprogrammed radius, the score is zero, and if the distance is greater than the preprogrammed radius, the score is set to one. The preprogrammed radius is also preferably set to a value high enough to prevent generation of false positives due to GPS drift.

In some embodiments, the system calculates a fifth correlation score based on whether the vehicle is following a planned route determined by a GPS navigation application running on the authorized driver's mobile device 16 (step 120). This score is based on the distance between the vehicle's current location and a nearest location that falls along the planned route. For example, if this distance is less than some preprogrammed value, the score is zero, and if the distance is greater than the preprogrammed value, the score is set to one. Again, the preprogrammed value is preferably large enough to prevent generation of false positives due to GPS drift. The value would also be set to allow for relatively small deviations from the planned route, so that small side trips, such as to get fuel, would not significantly affect the score. However, because most GPS navigation systems will adjust the planned route if the vehicle deviates from it, the distance from the planned route will not become very large before the GPS navigation system changes the route. Accordingly, this fifth correlation score may serve as a mitigation against other factors (driving a novel route, driving through a high crime area, etc.) So, in a preferred embodiment, the score would be 0 if the vehicle is within a given radius of the planned route and 1 if the vehicle is outside the radius. If there is no planned route, this score would also be set to 1 because the authorized driver has not used a GPS navigation system to indicate that he/she plans for the vehicle to be where it is.

In some embodiments, the system calculates a sixth correlation score based on whether the vehicle is located in a high crime area (step 122). This score is preferably considered in the context of other factors. For example, if the vehicle is travelling through a high crime area that the authorized driver regularly drives through at a particular time of day, and the vehicle's location correlates with the location of the authorized driver's mobile device 16, this indicates a low probability of theft. However, if the vehicle is travelling through a high crime area that the authorized driver does not regularly drive through, or the vehicle is travelling through any high crime area at a time of day that the authorized driver does not regularly drive, and the location of the authorized driver's mobile device 16 does not correlate with the location of the vehicle, this indicates a higher probability of theft.

Based on the individual correlation scores, the system calculates a theft probability value (step 124). The calculation of the theft probability value may include adjustment of the weight of one or more of the correlation scores based on various factors. For example, if the theft probability value is calculated on a weekend during which the authorized driver's driving routes are known to be somewhat unpredictable and known to vary significantly from the mid-week route between home and work, a lower weight may be applied to the first correlation score.

Thus, in a preferred embodiment, the theft probability value provides a numerical indication of the likelihood that the vehicle is being operated by the authorized driver or by someone else. For example, if the theft probability value has a possible range of 0% (theft not likely) to 100% (theft likely), a probability value below 50% indicates it is more likely than not that the vehicle is being operated by the authorized driver, whereas a probability value above 50% indicates it is more likely than not that the vehicle is being operated by someone other than the authorized driver. In this example, a predetermined threshold level of concern may be set at 60%, and this threshold may be adjusted as necessary based on false positives and other factors. If the theft probability value is below the concern threshold at step 126, the system loops back to step 110 and continues monitoring the vehicle location and driving behavior without taking action with regard to generating an alert.

If the theft probability value is above the concern threshold at step 126, a preferred embodiment of the system assumes that the authorized driver is not operating the vehicle, in which case the system sends a query message to the authorized driver's mobile device 16 (step 128). The query message—which is preferably an in-app message but could also be a text message or email message—asks whether the authorized driver is in control of the vehicle. If the system receives a response message from the authorized driver's mobile device 16 indicating that the authorized driver is in control of the vehicle (step 130), a preferred embodiment of the system uses this false positive to train the machine learning software (step 132), and loops back to step 110 to continue monitoring the vehicle location and driving behavior without taking action with regard to generating an alert.

In preferred embodiments, the machine learning software is also trained based on confirmation that the system detected an actual theft (true positive—step 136), based on confirmation that the system did not detect a theft when there was no theft (true negative), and based on confirmation that the system did not detect a theft when a theft actually occurred (step 140—false negative). In some embodiments, information regarding an undetected theft is provided to the machine learning software via information entered into the software application 33 after the theft is detected by other means. The information entered into the application 33 preferably includes the date and time that the vehicle was stolen, so that the system can process the vehicle data before and after that date/time to train the machine learning software to improve its identification of stolen vehicle behavior.

If the system receives a response message from the authorized driver's mobile device 16 indicating that the authorized driver is not in control of the vehicle (step 130), then the system transmits an alert message indicating that the vehicle has been stolen (step 134). The alert message may be sent as an in-app message or text message to the authorized driver's mobile device 16, and/or as an email or text message to a backup emergency contact. In some embodiments, if the system receives no response to the query message within some predetermined period of time, the alert message will be transmitted.

Alert messages may also be directed to other entities having an interest in the vehicle, such a lender (when the vehicle is collateral for a loan), or members of the authorized driver's family. Sending the alert messages to such third party entities would likely require some sort of opt-in authorization step.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A computer-implemented method for detecting theft of a vehicle in which a vehicle monitoring device is installed, comprising:
    (a) receiving initial vehicle data transmitted from the vehicle monitoring device while the vehicle is driven by an authorized driver over an initial period of time, the initial vehicle data including vehicle location data and vehicle motion data that are indicative of driving behavior of the authorized driver during the initial period of time;
    (b) processing the initial vehicle data using machine learning software to ascertain patterns in one or more of routes, destinations, speed, and acceleration of the vehicle when driven by the authorized driver during the initial period of time;
    (c) receiving subsequent vehicle data transmitted from the vehicle monitoring device while the vehicle is driven on a trip after the initial period of time, the subsequent vehicle data including vehicle location data and vehicle motion data that are indicative of driving behavior of a driver of the vehicle during the trip;
    (d) comparing the subsequent vehicle data to the patterns ascertained in step (b), and calculating one or more behavior correlation scores based on the comparison;
    (e) determining a theft probability value based at least in part on the one or more behavior correlation scores;
    (f) comparing the theft probability value to a theft concern threshold;
    (g) based on the theft probability value exceeding the theft concern threshold, sending a query message to a mobile communication device associated with the authorized driver, wherein the query message inquires whether the authorized driver is driving the vehicle during the trip;
    (h) receiving a response message transmitted from the mobile communication device associated with the authorized driver, the response message including response information indicating whether or not the authorized driver is driving the vehicle during the trip; and
    (i) if the response information indicates that the authorized driver is not driving the vehicle on the trip, sending a theft alert message to the mobile communication device associated with the authorized driver, the theft alert message including a current location of the vehicle.

2. The method of claim 1 wherein, if the response information indicates that the authorized driver is driving the vehicle on the trip, the machine learning software using the response information to refine the patterns ascertained in step (b), and the method continuing at step (c).

3. The method of claim 1 wherein, if the response information indicates that the authorized driver is not driving the vehicle, or if the vehicle is later reported to have been stolen, the machine learning software using the response information or theft report information to refine the patterns ascertained in step (b), and the method continuing at step (c).

4. The method of claim 1 wherein the patterns ascertained in step (b) include one or more of a pattern in:
    acceleration from a stop;
    braking;
    speed around curves;
    observance or nonobservance of speed limits;
    routes taken on a daily basis; and
    daily destinations.

5. The method of claim 1 further comprising:
    acquiring device location data from the mobile communication device associated with the authorized driver, the device location data indicating a current location of the mobile communication device;
    comparing the current location of the mobile communication device to a current location of the vehicle determined from the vehicle location data;

calculating a location correlation score based on comparing the current location of the vehicle to the current location of the mobile communication device; and including the location correlation score in the determination of the theft probability value.

6. The method of claim 1 further comprising:

acquiring soft lock location data from the vehicle monitoring device, the soft lock location data indicating a location at which the authorized driver parked and left the vehicle;

periodically acquiring current vehicle location data after acquisition of the soft lock location data;

comparing the current vehicle location data to the soft lock location data;

calculating a soft lock location correlation score based on comparison of the current vehicle location data to the soft lock location data; and including the soft lock location correlation score in the determination of the theft probability value.

7. The method of claim 1 further comprising:

determining based on the vehicle location data whether the vehicle is traveling through a high crime area;

calculating a high crime area correlation score based on whether the vehicle is traveling through a high crime area; and including the high crime area correlation score in the determination of the theft probability value.

8. The method of claim 1 further comprising:

acquiring route navigation data from the mobile communication device, the route navigation data indicating a planned route for the trip that is determined by a GPS navigation application running on the mobile communication device;

comparing the current vehicle location data to the route navigation data;

calculating a route navigation correlation score based on comparison of the current vehicle location data to the route navigation data; and including the route navigation correlation score in the determination of the theft probability value.

9. The method of claim 1 wherein the subsequent vehicle data received in step (c) is used to refine the patterns ascertained in step (b) as the vehicle is driven by the authorized driver during trips occurring after the initial period of time.

10. The method of claim 1 wherein the vehicle motion data includes vehicle speed information and vehicle acceleration information.

11. A vehicle monitoring system comprising:
a vehicle monitoring device configured for installation in a vehicle, the vehicle monitoring device comprising:
one or more sensors for generating vehicle motion data indicative of one or more of vehicle speed and vehicle acceleration;
a first Global Positioning System receiver for generating vehicle location data;
a first data processor for processing the vehicle motion data and the vehicle location data; and
a first wireless data transceiver in communication with a wireless data network, the first wireless data transceiver for transmitting the vehicle motion data and the vehicle location data via the wireless data network;
a mobile communication device associated with the authorized driver, the mobile communication device comprising:
a second Global Positioning System receiver for generating mobile communication device location data;
a second wireless data transceiver in communication with the wireless data network, the second wireless data transceiver for transmitting the mobile communication device location data and receiving commands and messages via the wireless data network;
a second data processor for processing the commands and messages; and
a display device for displaying information related to the messages; and
a central vehicle monitoring server in communication with the wireless data network, the central vehicle monitoring server executing instructions to:
receive initial vehicle data transmitted from the vehicle monitoring device while the vehicle is driven by an authorized driver over an initial period of time, the initial vehicle data including vehicle location data and vehicle motion data that are indicative of driving behavior of the authorized driver during the initial period of time;
process the initial vehicle data to ascertain patterns in one or more of routes, destinations, speed, and acceleration of the vehicle when driven by the authorized driver during the initial period of time;
receive subsequent vehicle data transmitted from the vehicle monitoring device while the vehicle is driven on a trip after the initial period of time, the subsequent vehicle data including vehicle location data and vehicle motion data that are indicative of driving behavior of a driver of the vehicle during the trip;
compare the subsequent vehicle data to the previously ascertained patterns, and calculate one or more behavior correlation scores based on the comparison;
determine a theft probability value based at least in part on the one or more behavior correlation scores;
compare the theft probability value to a theft concern threshold;
based on the theft probability value exceeding the theft concern threshold, send a query message to the mobile communication device, wherein the query message inquires whether the authorized driver is driving the vehicle during the trip;
receive a response message transmitted from the mobile communication device, the response message including response information indicating whether or not the authorized driver is driving the vehicle during the trip; and
if the response information indicates that the authorized driver is not driving the vehicle on the trip, send a theft alert message to the mobile communication device, the theft alert message including a current location of the vehicle.

12. The vehicle monitoring system of claim 11 wherein, if the response information indicates that the authorized driver is driving the vehicle on the trip, the central vehicle monitoring server uses the response information to refine the previously ascertained patterns.

13. The vehicle monitoring system of claim 11 wherein the previously ascertained patterns include one or more of a pattern in:
acceleration from a stop;
braking;
speed around curves;
observance or nonobservance of speed limits;
routes taken on a daily basis; and
daily destinations.

14. The vehicle monitoring system of claim 11 further comprising the central vehicle monitoring server:
acquiring device location data from the mobile communication device, the device location data indicating a current location of the mobile communication device;
comparing a current location of the vehicle to the current location of the mobile communication device;
calculating a location correlation score based on comparing the current location of the vehicle to the current location of the mobile communication device; and
including the location correlation score in the one or more behavior correlation scores that are used to determine the theft probability value.

15. The vehicle monitoring system of claim 11 further comprising the central vehicle monitoring server:
acquiring soft lock location data from the vehicle monitoring device, the soft lock location data indicating a location at which the authorized driver parked and left the vehicle;
periodically acquiring current vehicle location data after acquisition of the soft lock location data;
comparing the current vehicle location data to the soft lock location data;
calculating a soft lock location correlation score based comparing the current vehicle location data to the soft lock location data; and
including the soft lock location correlation score in the one or more behavior correlation scores that are used to determine the theft probability value.

16. The vehicle monitoring system of claim 11 further comprising the central vehicle monitoring server:
determining based on the vehicle location data whether the vehicle is traveling through a high crime area;
calculating a high crime area correlation score based on whether the vehicle is traveling through a high crime area; and
including the high crime area correlation score in the one or more behavior correlation scores that are used to determine the theft probability value.

17. The vehicle monitoring system of claim 11 further comprising the central vehicle monitoring server:
acquiring route navigation data from the mobile communication device, the route navigation data indicating a planned route for the trip that is determined by a GPS navigation application running on the mobile communication device;
comparing the current vehicle location data to the route navigation data;
calculating a route navigation correlation score based on comparing the current vehicle location data to the route navigation data; and
including the route navigation correlation score in the one or more behavior correlation scores that are used to determine the theft probability value.

18. The vehicle monitoring system of claim 11 wherein the central vehicle monitoring server uses the subsequent vehicle data to refine the subsequently ascertained patterns as the vehicle is driven by the authorized driver during trips occurring after the initial period of time.

19. A computer-implemented method for detecting theft of a vehicle in which a vehicle monitoring device is installed, comprising:
(a) receiving initial vehicle data transmitted from the vehicle monitoring device while the vehicle is driven by an authorized driver over an initial period of time, the initial vehicle data including vehicle location data and vehicle motion data that are indicative of driving behavior of the authorized driver during the initial period of time;
(b) processing the initial vehicle data using machine learning software to ascertain patterns in one or more of routes, destinations, speed, and acceleration of the vehicle when driven by the authorized driver during the initial period of time;
(c) receiving subsequent vehicle data transmitted from the vehicle monitoring device while the vehicle is driven on a trip after the initial period of time, the subsequent vehicle data including vehicle location data and vehicle motion data that are indicative of driving behavior of a driver of the vehicle during the trip;
(d) comparing the subsequent vehicle data to the patterns ascertained in step (b), and calculating one or more behavior correlation scores based on the comparison;
(e) acquiring device location data from a mobile communication device associated with the authorized driver, the device location data indicating a current location of the mobile communication device;
(f) comparing the current location of the mobile communication device to a current location of the vehicle determined from the vehicle location data;
(g) calculating a location correlation score based on comparing the current location of the vehicle to the current location of the mobile communication device;
(h) determining a theft probability value based at least in part on the one or more behavior correlation scores and the location correlation score;
(i) comparing the theft probability value to a theft concern threshold;
(j) based on the theft probability value exceeding the theft concern threshold, sending a query message to a mobile communication device associated with the authorized driver, wherein the query message inquires whether the authorized driver is driving the vehicle during the trip; and
(k) receiving a response message transmitted from the mobile communication device associated with the authorized driver, the response message including response information indicating whether or not the authorized driver is driving the vehicle during the trip.

20. A computer-implemented method for detecting theft of a vehicle in which a vehicle monitoring device is installed, comprising:
(a) receiving initial vehicle data transmitted from the vehicle monitoring device while the vehicle is driven by an authorized driver over an initial period of time, the initial vehicle data including vehicle location data and vehicle motion data that are indicative of driving behavior of the authorized driver during the initial period of time;
(b) processing the initial vehicle data using machine learning software to ascertain patterns in one or more of routes, destinations, speed, and acceleration of the vehicle when driven by the authorized driver during the initial period of time;
(c) receiving subsequent vehicle data transmitted from the vehicle monitoring device while the vehicle is driven on a trip after the initial period of time, the subsequent vehicle data including vehicle location data and vehicle motion data that are indicative of driving behavior of a driver of the vehicle during the trip;
(d) comparing the subsequent vehicle data to the patterns ascertained in step (b), and calculating one or more behavior correlation scores based on the comparison;

(e) determining based on the vehicle location data whether the vehicle is traveling through a high crime area;
(f) calculating a high crime area correlation score based on whether the vehicle is traveling through a high crime area;
(g) determining a theft probability value based at least in part on the one or more behavior correlation scores and the high crime area correlation score;
(h) comparing the theft probability value to a theft concern threshold;
(i) based on the theft probability value exceeding the theft concern threshold, sending a query message to a mobile communication device associated with the authorized driver, wherein the query message inquires whether the authorized driver is driving the vehicle during the trip; and
(j) receiving a response message transmitted from the mobile communication device associated with the authorized driver, the response message including response information indicating whether or not the authorized driver is driving the vehicle during the trip.

21. A computer-implemented method for detecting theft of a vehicle in which a vehicle monitoring device is installed, comprising:
(a) receiving initial vehicle data transmitted from the vehicle monitoring device while the vehicle is driven by an authorized driver over an initial period of time, the initial vehicle data including vehicle location data and vehicle motion data that are indicative of driving behavior of the authorized driver during the initial period of time;
(b) processing the initial vehicle data using machine learning software to ascertain patterns in one or more of routes, destinations, speed, and acceleration of the vehicle when driven by the authorized driver during the initial period of time;
(c) receiving subsequent vehicle data transmitted from the vehicle monitoring device while the vehicle is driven on a trip after the initial period of time, the subsequent vehicle data including vehicle location data and vehicle motion data that are indicative of driving behavior of a driver of the vehicle during the trip;
(d) comparing the subsequent vehicle data to the patterns ascertained in step (b), and calculating one or more behavior correlation scores based on the comparison;
(e) acquiring route navigation data from a mobile communication device, the route navigation data indicating a planned route for the trip that is determined by a GPS navigation application running on the mobile communication device;
(f) comparing the current vehicle location data to the route navigation data;
(g) calculating a route navigation correlation score based on comparison of the current vehicle location data to the route navigation data; and
(h) determining a theft probability value based at least in part on the one or more behavior correlation scores and the route navigation correlation score;
(i) comparing the theft probability value to a theft concern threshold;
(j) based on the theft probability value exceeding the theft concern threshold, sending a query message to a mobile communication device associated with the authorized driver, wherein the query message inquires whether the authorized driver is driving the vehicle during the trip; and
(k) receiving a response message transmitted from the mobile communication device associated with the authorized driver, the response message including response information indicating whether or not the authorized driver is driving the vehicle during the trip.

22. A vehicle monitoring system comprising:
a vehicle monitoring device configured for installation in a vehicle, the vehicle monitoring device comprising:
  one or more sensors for generating vehicle motion data indicative of one or more of vehicle speed and vehicle acceleration;
  a first Global Positioning System receiver for generating vehicle location data;
  a first data processor for processing the vehicle motion data and the vehicle location data; and
  a first wireless data transceiver in communication with a wireless data network, the first wireless data transceiver for transmitting the vehicle motion data and the vehicle location data via the wireless data network;
a mobile communication device associated with the authorized driver, the mobile communication device comprising:
  a second Global Positioning System receiver for generating mobile communication device location data;
  a second wireless data transceiver in communication with the wireless data network, the second wireless data transceiver for transmitting the mobile communication device location data and receiving commands and messages via the wireless data network;
  a second data processor for processing the commands and messages; and
  a display device for displaying information related to the messages; and
a central vehicle monitoring server in communication with the wireless data network, the central vehicle monitoring server executing instructions to:
  receive initial vehicle data transmitted from the vehicle monitoring device while the vehicle is driven by an authorized driver over an initial period of time, the initial vehicle data including vehicle location data and vehicle motion data that are indicative of driving behavior of the authorized driver during the initial period of time;
  process the initial vehicle data to ascertain patterns in one or more of routes, destinations, speed, and acceleration of the vehicle when driven by the authorized driver during the initial period of time;
  receive subsequent vehicle data transmitted from the vehicle monitoring device while the vehicle is driven on a trip after the initial period of time, the subsequent vehicle data including vehicle location data and vehicle motion data that are indicative of driving behavior of a driver of the vehicle during the trip;
  compare the subsequent vehicle data to the previously ascertained patterns, and calculate one or more behavior correlation scores based on the comparison;
  acquire device location data from the mobile communication device, the device location data indicating a current location of the mobile communication device;
  compare a current location of the vehicle to the current location of the mobile communication device;
  calculate a location correlation score based on comparing the current location of the vehicle to the current location of the mobile communication device;

determine a theft probability value based at least in part on the one or more behavior correlation scores and the location correlation score;

compare the theft probability value to a theft concern threshold;

based on the theft probability value exceeding the theft concern threshold, send a query message to the mobile communication device, wherein the query message inquires whether the authorized driver is driving the vehicle during the trip; and receive a response message transmitted from the mobile communication device, the response message including response information indicating whether or not the authorized driver is driving the vehicle during the trip.

23. A vehicle monitoring system comprising:

a vehicle monitoring device configured for installation in a vehicle, the vehicle monitoring device comprising:

one or more sensors for generating vehicle motion data indicative of one or more of vehicle speed and vehicle acceleration;

a first Global Positioning System receiver for generating vehicle location data;

a first data processor for processing the vehicle motion data and the vehicle location data; and a first wireless data transceiver in communication with a wireless data network, the first wireless data transceiver for transmitting the vehicle motion data and the vehicle location data via the wireless data network;

a mobile communication device associated with the authorized driver, the mobile communication device comprising:

a second Global Positioning System receiver for generating mobile communication device location data;

a second wireless data transceiver in communication with the wireless data network, the second wireless data transceiver for transmitting the mobile communication device location data and receiving commands and messages via the wireless data network;

a second data processor for processing the commands and messages; and a display device for displaying information related to the messages; and a central vehicle monitoring server in communication with the wireless data network, the central vehicle monitoring server executing instructions to:

receive initial vehicle data transmitted from the vehicle monitoring device while the vehicle is driven by an authorized driver over an initial period of time, the initial vehicle data including vehicle location data and vehicle motion data that are indicative of driving behavior of the authorized driver during the initial period of time;

process the initial vehicle data to ascertain patterns in one or more of routes, destinations, speed, and acceleration of the vehicle when driven by the authorized driver during the initial period of time;

receive subsequent vehicle data transmitted from the vehicle monitoring device while the vehicle is driven on a trip after the initial period of time, the subsequent vehicle data including vehicle location data and vehicle motion data that are indicative of driving behavior of a driver of the vehicle during the trip;

compare the subsequent vehicle data to the previously ascertained patterns, and calculate one or more behavior correlation scores based on the comparison;

determine based on the vehicle location data whether the vehicle is traveling through a high crime area;

calculate a high crime area correlation score based on whether the vehicle is traveling through a high crime area;

determine a theft probability value based at least in part on the one or more behavior correlation scores and the high crime area correlation score;

compare the theft probability value to a theft concern threshold;

based on the theft probability value exceeding the theft concern threshold, send a query message to the mobile communication device, wherein the query message inquires whether the authorized driver is driving the vehicle during the trip; and receive a response message transmitted from the mobile communication device, the response message including response information indicating whether or not the authorized driver is driving the vehicle during the trip.

24. A vehicle monitoring system comprising:

a vehicle monitoring device configured for installation in a vehicle, the vehicle monitoring device comprising:

one or more sensors for generating vehicle motion data indicative of one or more of vehicle speed and vehicle acceleration;

a first Global Positioning System receiver for generating vehicle location data;

a first data processor for processing the vehicle motion data and the vehicle location data; and a first wireless data transceiver in communication with a wireless data network, the first wireless data transceiver for transmitting the vehicle motion data and the vehicle location data via the wireless data network;

a mobile communication device associated with the authorized driver, the mobile communication device comprising:

a second Global Positioning System receiver for generating mobile communication device location data;

a second wireless data transceiver in communication with the wireless data network, the second wireless data transceiver for transmitting the mobile communication device location data and receiving commands and messages via the wireless data network;

a second data processor for processing the commands and messages; and a display device for displaying information related to the messages; and a central vehicle monitoring server in communication with the wireless data network, the central vehicle monitoring server executing instructions to:

receive initial vehicle data transmitted from the vehicle monitoring device while the vehicle is driven by an authorized driver over an initial period of time, the initial vehicle data including vehicle location data and vehicle motion data that are indicative of driving behavior of the authorized driver during the initial period of time;

process the initial vehicle data to ascertain patterns in one or more of routes, destinations, speed, and acceleration of the vehicle when driven by the authorized driver during the initial period of time;

receive subsequent vehicle data transmitted from the vehicle monitoring device while the vehicle is driven on a trip after the initial period of time, the subsequent vehicle data including vehicle location data and vehicle motion data that are indicative of driving behavior of a driver of the vehicle during the trip;

compare the subsequent vehicle data to the previously ascertained patterns, and calculate one or more behavior correlation scores based on the comparison;

acquire route navigation data from the mobile communication device, the route navigation data indicating a planned route for the trip that is determined by a GPS navigation application running on the mobile communication device;

compare the current vehicle location data to the route navigation data;

calculate a route navigation correlation score based on comparing the current vehicle location data to the route navigation data; and determine a theft probability value based at least in part on the one or more behavior correlation scores and the route navigation correlation score;

compare the theft probability value to a theft concern threshold;

based on the theft probability value exceeding the theft concern threshold, send a query message to the mobile communication device, wherein the query message inquires whether the authorized driver is driving the vehicle during the trip; and receive a response message transmitted from the mobile communication device, the response message including response information indicating whether or not the authorized driver is driving the vehicle during the trip.

* * * * *